T. CARROLL.
CASH REGISTER.
APPLICATION FILED MAR. 23, 1901. RENEWED SEPT. 15, 1906.
977,509.
Patented Dec. 6, 1910.
8 SHEETS—SHEET 1.
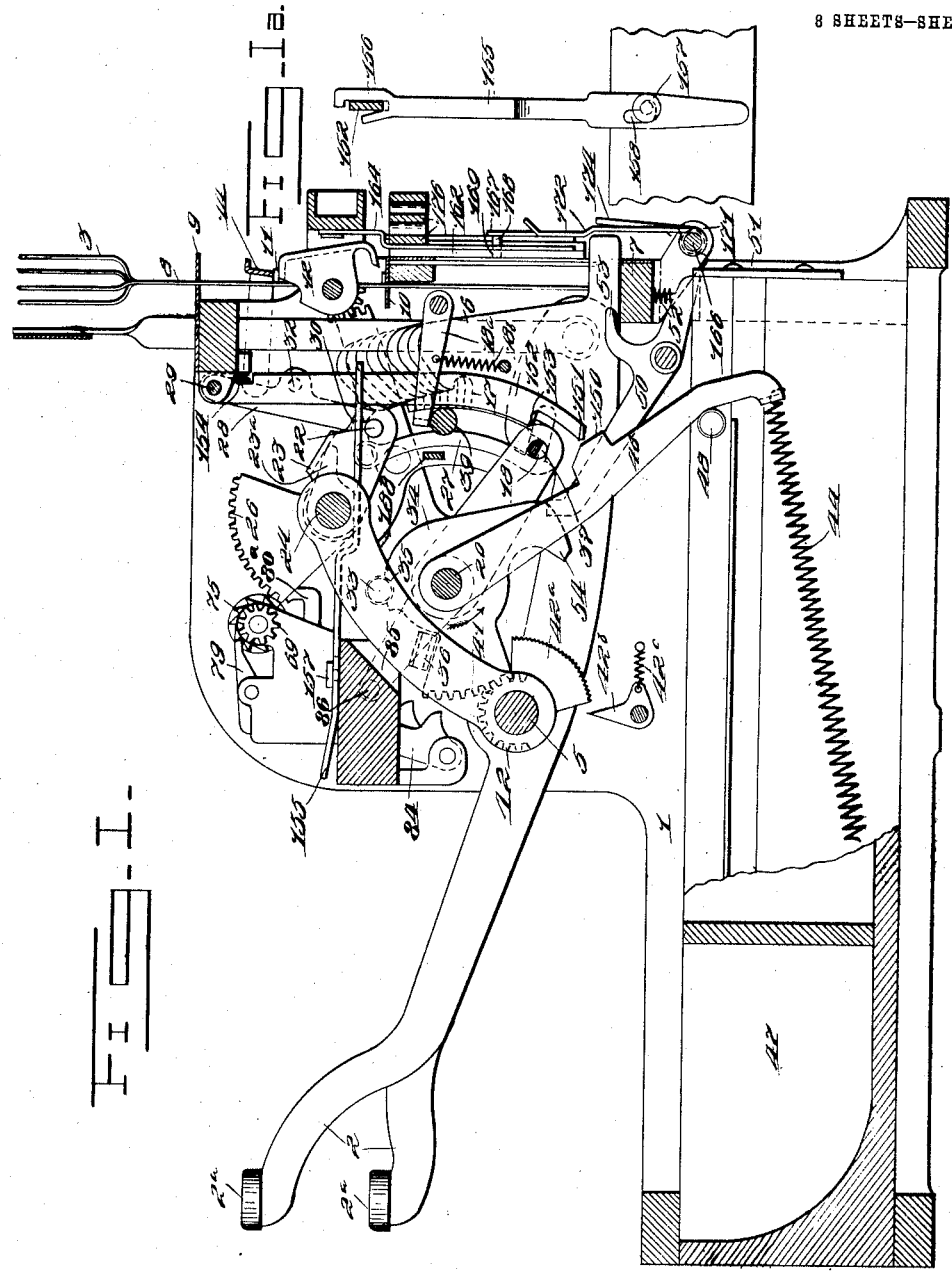
Witnesses
W. M. McCarthy
Wm. H. Muzzy
Inventor
Thomas Carroll
By Alvan Macauley
Attorney

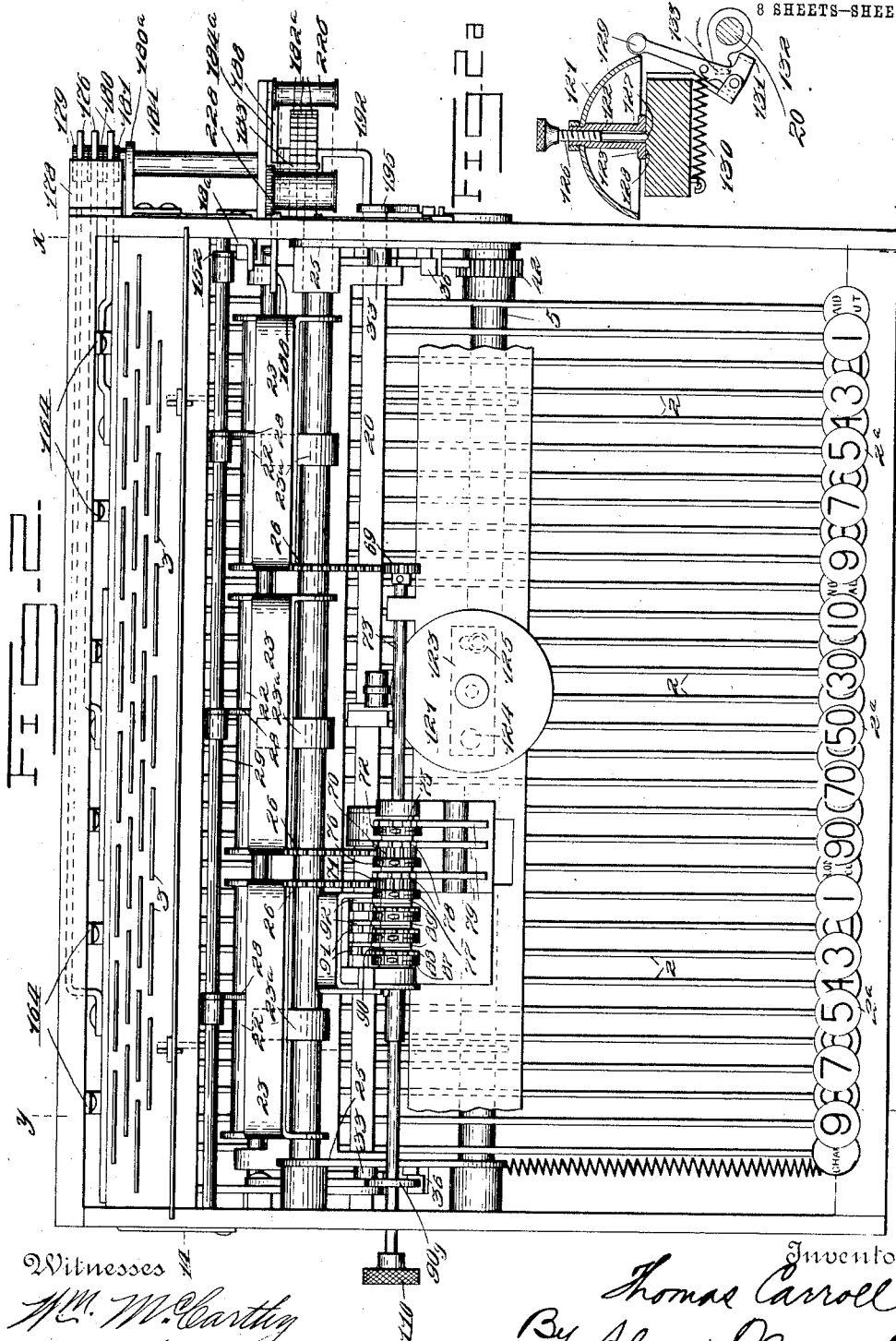

T. CARROLL.
CASH REGISTER.
APPLICATION FILED MAR. 23, 1901. RENEWED SEPT. 15, 1906.
977,509.
Patented Dec. 6, 1910.
8 SHEETS—SHEET 3.
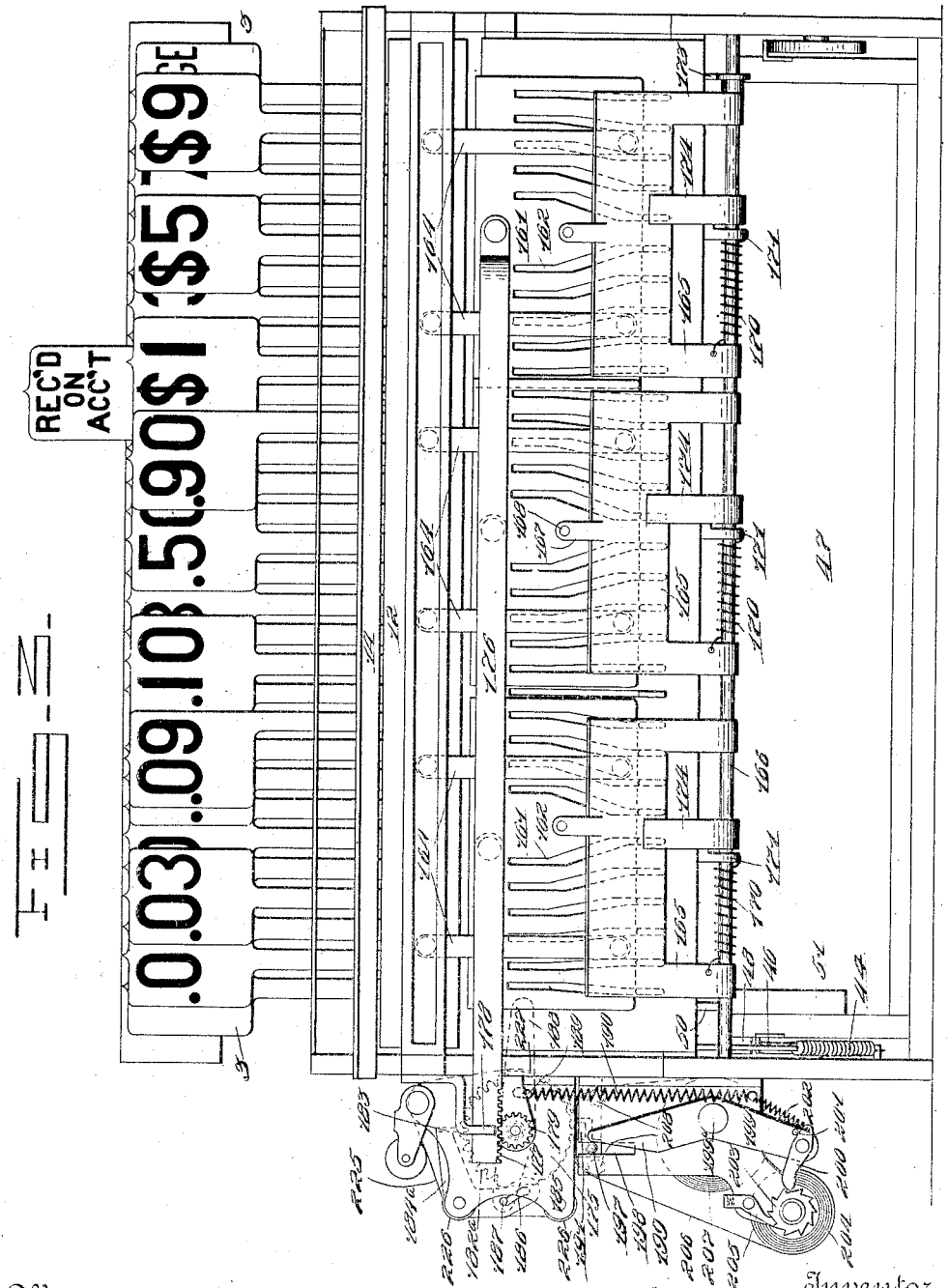

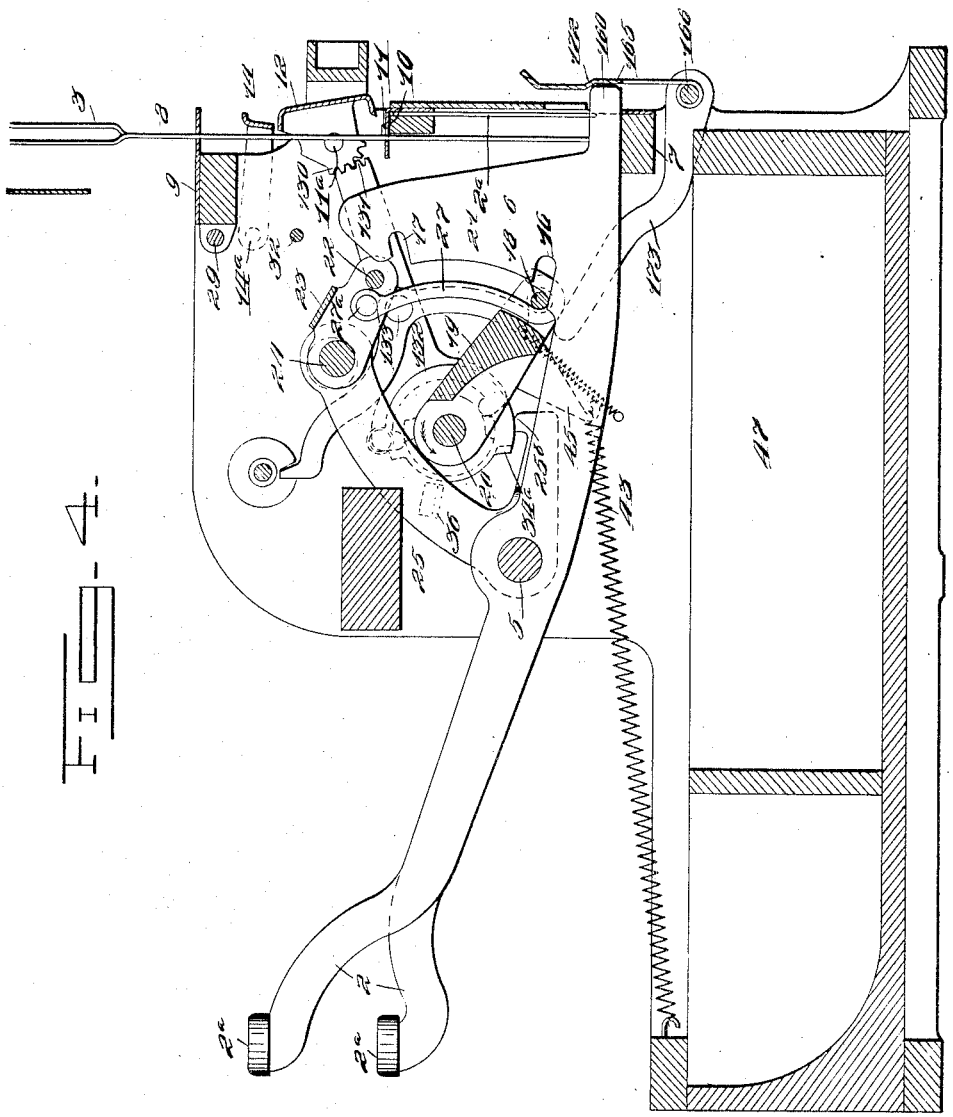

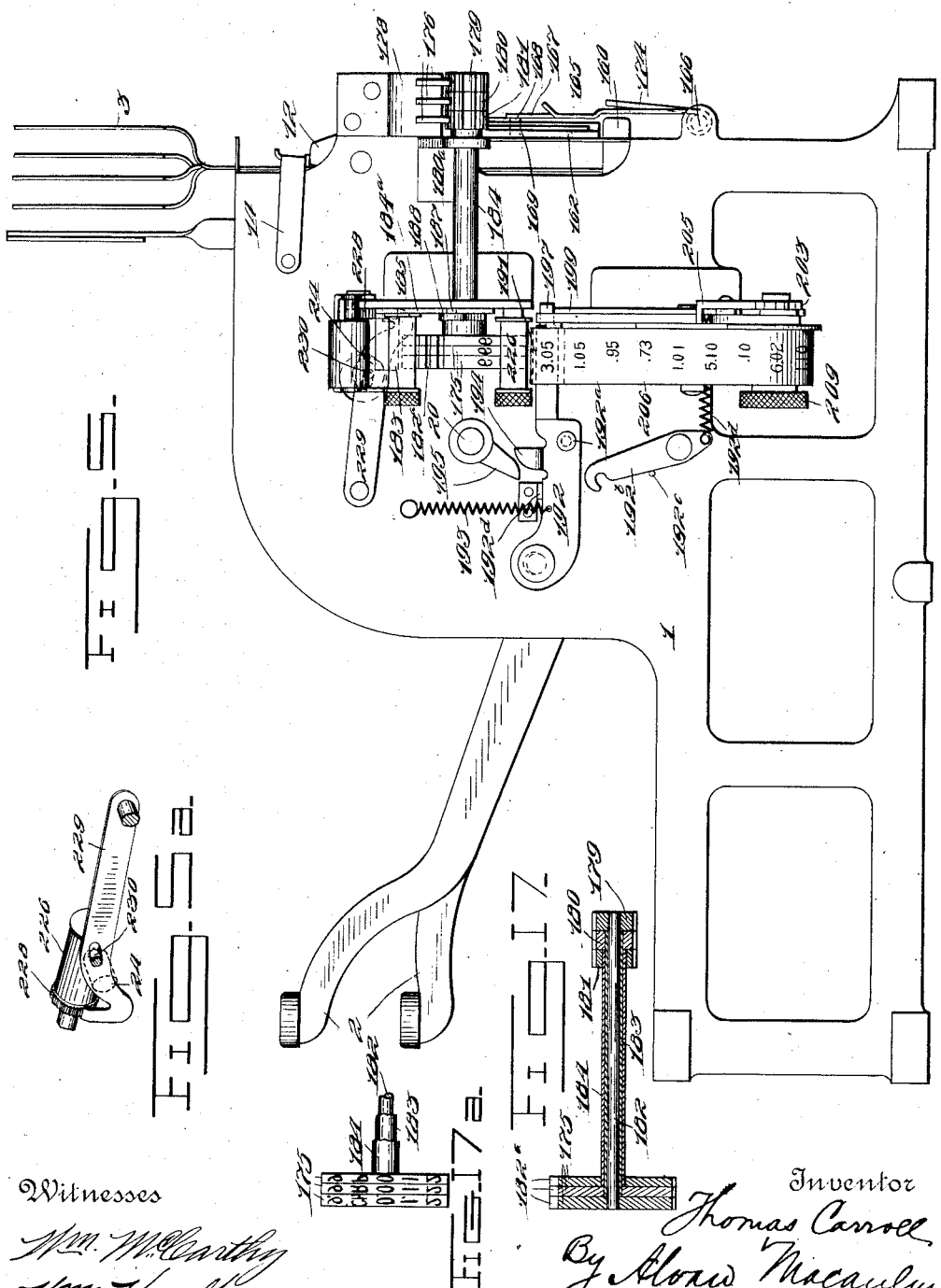

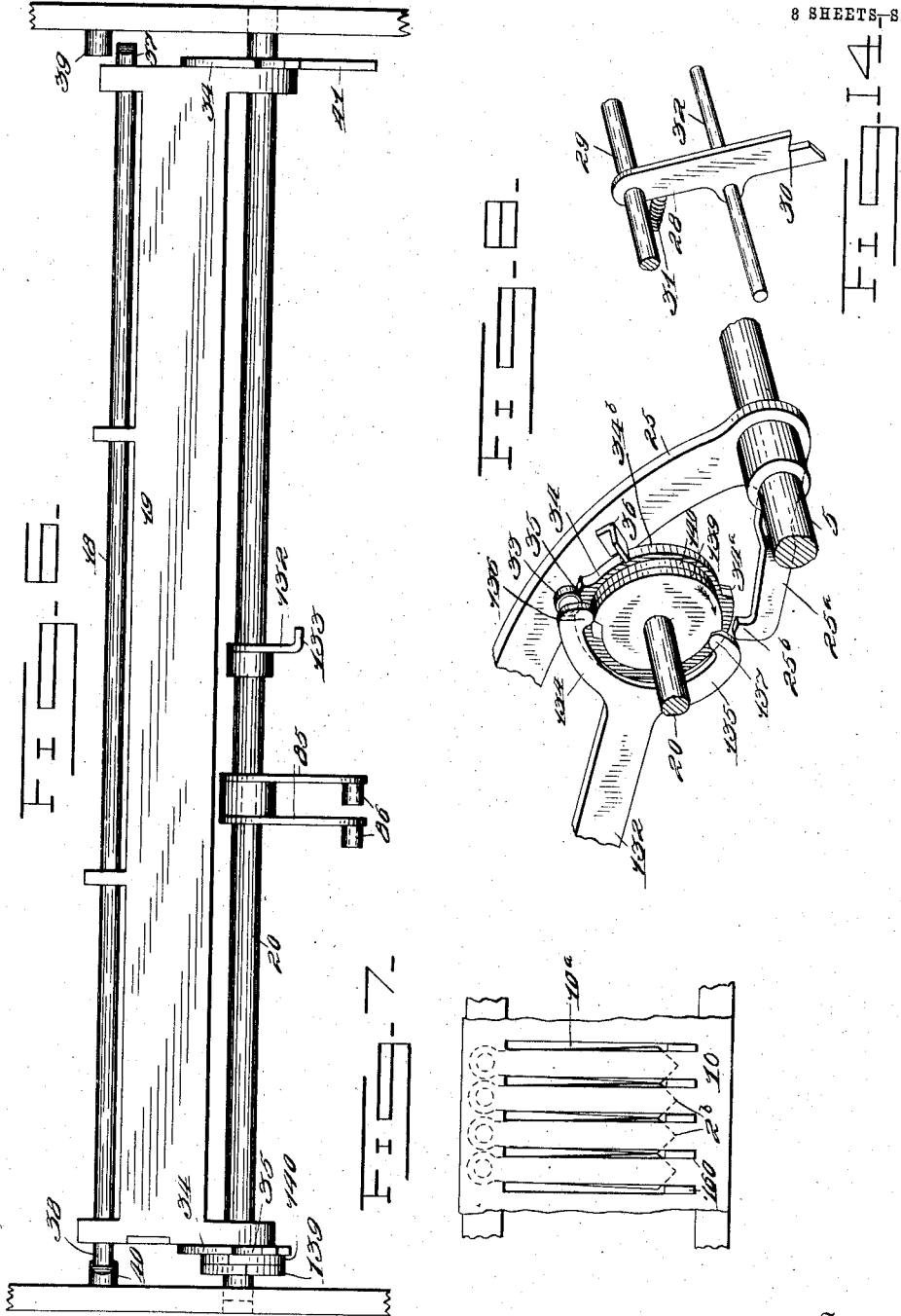

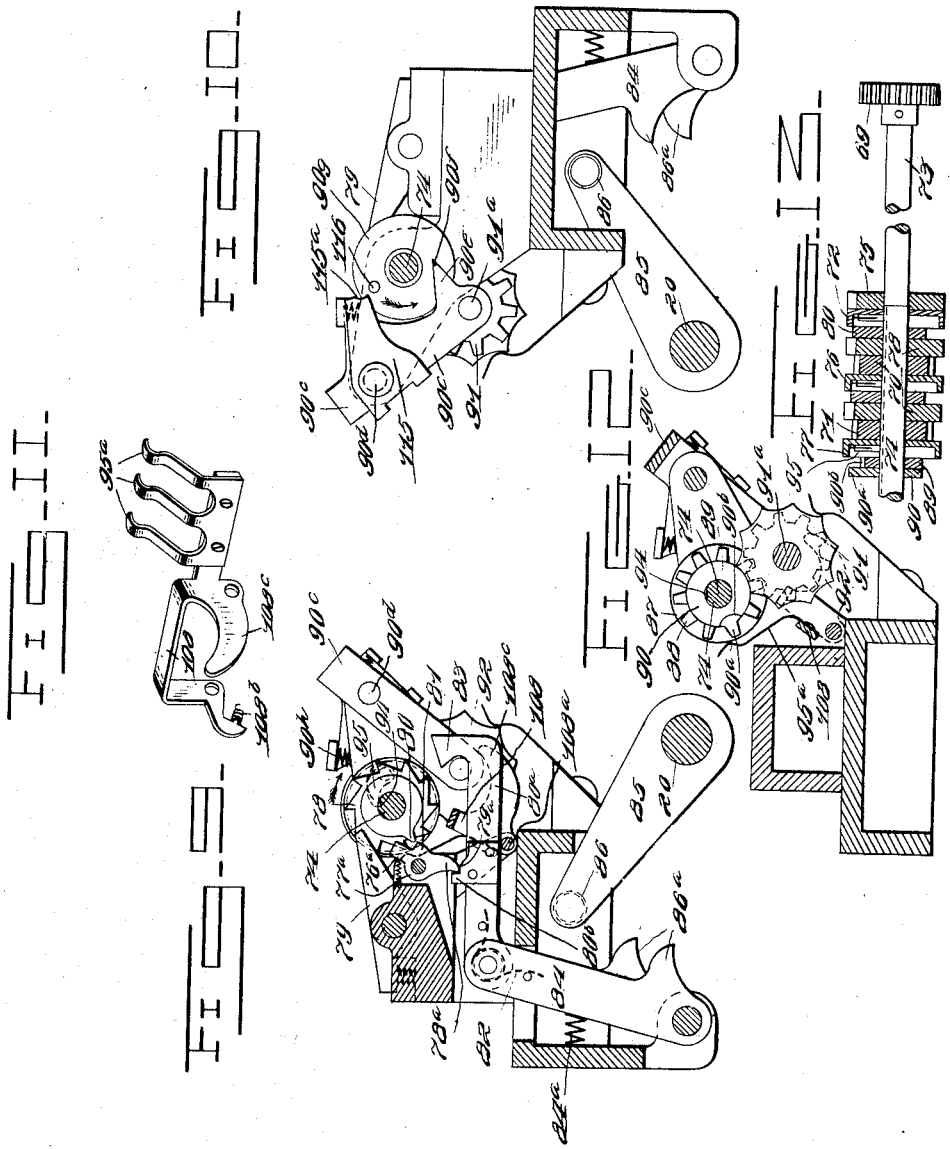

T. CARROLL.
CASH REGISTER.
APPLICATION FILED MAR. 23, 1901. RENEWED SEPT. 15, 1906.
977,509.
Patented Dec. 6, 1910.
8 SHEETS—SHEET 8.
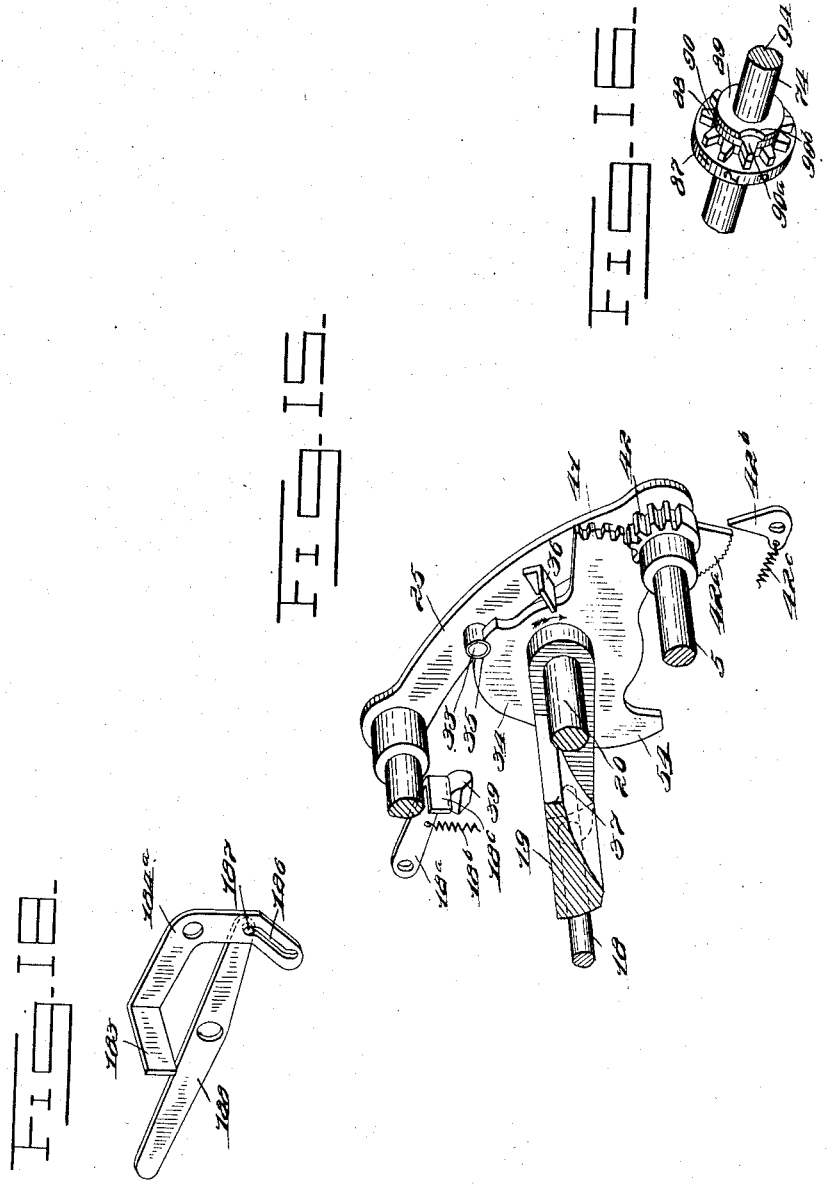

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

977,509.   Specification of Letters Patent.   Patented Dec. 6, 1910.

Application filed March 23, 1901, Serial No. 52,479.   Renewed September 15, 1906.   Serial No. 334,777.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

The invention relates to certain new and useful improvements in cash registers.

It consists specifically of improvements and novel constructions affecting almost every part of the machine, including the printing devices, as well as the registering mechanism.

The novel features will be more particularly hereinafter described, and pointed out in the claims.

In the accompanying drawings forming part of this specification: Figure 1, represents a transverse vertical section partly in elevation through the machine embodying my invention taken on the line $x$—$x$ of Fig. 2, the cabinet being removed. Fig. 1ª represents a detail side elevation of the lever for turning the key lock on and off. Fig. 2, represents a top plan view of my improved machine. Fig. 2ª, represents a detail central vertical section, partly in elevation of the bell and its operating devices. Fig. 3, represents a rear elevation of said devices; the cash drawer being omitted and one of the special indicators shown in its raised position. Fig. 4, represents a transverse vertical section through said machine on the line $y$—$y$ of Fig. 2. Fig. 5 represents an end elevation of my improved machine showing the printing attachment. Fig. 5ª, represents an enlarged detail perspective view of the ribbon feeding roller and its operating pawl. Fig. 6, represents a detail top plan view of the laterally movable key coupler and coöperating parts. Fig. 7, represents a detail rear elevation of a number of the key hangers or stops and the key guide plate. Fig. 8, represents a detail perspective view of the operating cams movable with the key coupler, and the coacting parts. Fig. 9, represents a detail vertical section through the counter and the transfer devices. Fig. 10 represents a detail end elevation of the counter and transfer devices. Fig. 11 represents a detail perspective view of the rock frame and retaining pawls for the counter. Fig. 12 represents a vertical transverse section through the counter taken on a different line from Fig. 9. Fig. 13 represents a detail vertical longitudinal section through the counter. Fig. 14, represents a detail perspective view of one of the lock-levers for the registering frames. Fig. 15 represents a detail perspective view of one of the rock-frame levers, its operating cam and coöperating parts, and Fig. 16 represents a detail perspective view of one of the higher denomination counter wheels, its gear, locking disk and cam. Fig. 17 represents a longitudinal section through the printing wheels and sleeves. Fig. 17ª represents a detail view of the printing wheels showing the sleeves partly broken away. Fig. 18 represents a detail of part of the printing device.

In the aforesaid drawings 1 represents the frame of the machine, 2 the operating key levers, and 3 the indicators. The key levers 2 as shown in Figs. 1 and 4 of the drawings are hung upon a transverse shaft 5 and are provided at their forward ends with suitable numbered or lettered finger buttons 2ª. The keys are arranged in groups which in the present instance represent units of cents, tens of cents and units of dollars. As each bank of keys is substantially of the same construction and operation I will describe one bank only as such description will suffice for all. The key-levers, which are numbered from one to nine, are formed at their rear ends with graduated vertical standards 6 as shown in Figs. 1 and 4. Each key-lever rests when in normal position, with its rear end upon a transverse rigid supporting bar 7 and is adapted to support an indicator stem 8 which rests upon said key lever. Said indicator stems are loosely mounted in suitable guide plates 9 and 10 secured to the frame of the machine, and are provided with indicator flags or tablets 3 which in turn are provided on both sides with numbers or characters for indicating the amounts of the keys which they represent. The plate 10 as best shown in Fig. 7, extends down the back of the machine and is formed with vertical key-guiding slots 10ª through which the rear ends of the keys project. Each of the said indicator stems 8 is provided with a lug 11 which is adapted to catch over the upper flange of a rocking supporting-frame 12, when said indicator stem is raised and thus hold said indicator in its elevated position. The supporting-frame, as shown in Fig. 4 is pivoted at 11ª so that when it is sufficiently rocked, as hereinafter described, to permit the lugs 11 of the operated keys to pass its upper flange, its lower flange will be thrown forward into the paths of the lugs 11 of the indicators belonging to the unoperated keys, and thus prevent the jumping of the indicators to indicating position by a sudden stroke upon its key. The frame 12 is rocked upon each operation of the machine as will be hereinafter described.

In order to assist the downward movement of an elevated indicator when the same is released from the supporting frame, I provide a pivoted starting frame 14 in the form of a yoke which extends back of the indicator stems, above and in line with the lugs 11. It is pivoted at each end of the frame of the machine as at 14ª.

The rear ends of the keys coöperate with a series of the well known form of pivoted pendent hangers or stops 2ᵇ, better shown in Fig. 7, and each of which is formed with a lower pointed end arranged to be struck by a key and thus forced to one side. These hangers are arranged in groups or banks corresponding to the banks of keys and as usual operate to prevent the simultaneous operation of two or more keys in the same bank.

Each key standard 6 in its front edge near its base has a key-coupler notch or recess 16 and near its upper end a registering notch or recess 17 (see Fig. 4). The key-coupler notches are adapted to engage a bar 18 mounted in a key-coupling frame 19 which is fast upon the rock-shaft 20. The pivot points of the key-coupler and the keys respectively are so located in relation to each other that when the keys are operated the coupler will be swung upward and the rod 18 caused to enter the key-coupler notches of the operated keys and thus lock all of such operated keys to the coupler. The registering notches 17 of the keys of each bank are located at different distances from a horizontal rod 22 of a register-operating rock-frame 23 according to the value of their respective keys, and the lower wall of each of said notches projects beyond its upper wall so that when the key is operated said lower wall will engage and lift said bar. For convenience the register-operating rock-frames with their respective segments hereinafter described, will hereafter be referred to simply as registering segments.

It is evident that the registering notches need not be of any particular form. It is only necessary that they be arranged to engage the registering segment and lift it the proper distance according to the value of the particular key.

There are of course (Fig. 2) three registering frames one for each bank of keys and they are all journaled upon a rocking frame comprising a transverse swinging shaft 24 the ends of which are secured in two supports or side arms 25 which are pivoted upon the shaft 5 (Fig. 4). As the rocking-frame, which comprises the two side arms 25 and the swinging shaft 24, operates to bring the registering segments into and out of engagement with the counter, I shall hereinafter refer to it for convenience, as the counter-engaging frame. It will be readily understood that the registering frames are all pivoted upon the swinging shaft of the counter-engaging frame (Fig. 1). Each registering frame is supported in its lower normal position by a stop lug 23ª (see Fig. 2 and dotted lines in Fig. 1) fast to the shaft 24. Each registering frame comprises a segmental rack plate or segment 26 located at one end (see Fig. 2) and is normally drawn down to its lower retracted position by a hook shaped drag-bar 27 pivoted thereto as at 27ª (Fig. 4) and coöperating with the bar 18 of the coupler. When one of the registering frames 23 is raised by a key, it becomes coupled to said key to prevent overthrow, by its bar 22 passing into the registering notch 17 of the operated key in much the same manner that the coupler bar passes into the key-coupler notch. As the registering notches are located at different distances from the bar 22 it will be seen that the different keys will engage and move said bar different distances and thus rock the registering frames correspondingly. The segments thus make movements corresponding in value to the values of the operated keys, which movements are transmitted to the counter wheels in a manner hereinafter described.

Each registering frame is normally locked in its lowermost position by one of a series of three latch-arms 28 one for each bank of keys which are mounted loosely on a transverse shaft 29 (Figs. 1 and 14), and normally forced forward to bring their notched locking ends 30 over the respective rods 22 by coil springs 31 interposed between said latch arms and the main frame. Each latch arm is also provided with a transverse unlocking bar 32 projecting to each side and arranged to be struck by the upper edges of any one of the standards 6 to throw the latch-arm back out of the path of the bar 22 and thus unlock the corresponding registering-frame. The initial movement of any key, therefore, unlocks its corresponding registering frame.

As before mentioned the shaft 24 which supports the registering frames is mounted in supports or arms 25 and each of these arms is pivoted upon the shaft 5, and is provided with a laterally projecting anti-friction roller 33 as best shown in Fig. 8. These rollers are arranged to be engaged and forced upward by counter-engaging cam-disks 34 mounted on shaft 20 and fast to and movable with the key-coupling frame 19. As the key-coupler moves upward the anti-friction rollers are forced upward and forward out of cam notches 35 formed in said counter-engaging cam disks which action brings the rack-segments 26 into mesh with the counter pinions 69 hereinafter described. This counter-engaging movement of the rack-segments precedes their rocking or registering movements. As soon as the segments have completed their registering movement they are moved backward with and by the counter engaging frame because of the lateral or transverse shifting of the counter-engaging cams 34, which causes the latter to pass laterally out from under the anti-friction rollers 33 so that said rollers, the counter engaging frame and the registering frame drop back into disengaged position. I secure to each of said arms an angular plate 36 which extends laterally over and above said cams at all times, but during the initial or downward movement of the key said plates are not resting on the cams. It is true, as stated, that the cams are shifted laterally under the plates, but never far enough to pass out from under them. It follows, therefore, that when the counter-engaging cams are shifted out from under the rollers, the supporting arms, when pressure is relaxed on the operated keys at the completion of their downward movement, will drop down until the plates 36 rest respectively upon the peripheries of the cams 34.

The general operation of the mechanism thus described is therefore as follows: The initial movement of any key turns the counter-engaging cams in the direction of the arrow (Fig. 1) and thereby the counter-engaging frame is raised, throwing all the segments into engagement with their respective counter wheels. The segments are held thus engaged during the entire downward or initial stroke of the keys, during which time the segment-frames are engaged by the key standards and swing upon their shaft 24 so as to turn the respective counter wheels according to the value of the operated keys.
At the very end of the downward movement of the keys the key-coupler frame and the various members secured thereto, including the counter engaging cams, are shifted laterally to the left and the cams pass out from under the rollers 33. The supporting frame and the registering frame carried thereby do not, however, drop immediately as the pressure on the operated key holds the registering frames in engagement with the counter pinions and thereby sustains the supporting frame in its upper position. The instant, however, that the pressure upon the key is relaxed to permit it to begin its return movement, the registering frames drop out of engagement with the counter pinions and the supporting frame drops until the plates 36 rest upon the peripheries of the counter-engaging cams respectively. The parts remain in the position last described during the return movement of the key until the cam notches 35 are swung to a position opposite the rollers 33, at which time suitable devices, before referred to and to be hereafter described, shift the key-coupler back to normal position with the rollers 33 again resting upon the counter-engaging cams, as shown in Fig. 1. This general principle of mounting the registering racks or segments in a movable support and then by moving this support thereby carrying the registering segments into engagement with the counter, has already been made use of in a machine described in a prior application filed by me on Sept. 30, 1898, Serial No. 692,298; and in the present case, as in the prior case, the registering segments are arranged to accompany their actuators during both directions of reciprocation of the keys, the so-called actuators being, in the present case, the vertical standards 6 connected to the keys, which standards have the notches 17 formed therein for positively moving the horizontal rod 22 and therefore the registering segment during both directions of reciprocation of the key. Therefore after the key has reached the extremity of its downward stroke and the registration has been effected, the return of the key toward normal position would normally tend to turn the registering segment reversely provided the pivotal point of said segment were stationary relatively to the key, and would therefore cause a binding effect between the registering segment and the counter during the time of disengagement of these two members. Moreover it is desirable that disengagement should not be effected until the key has begun to return toward normal position, for if the disengagement occurs at the extremity of the downstroke of the key, overthrow of the counter will be possible upon the violent operation of a key. In the beforementioned prior application this difficulty was overcome by so mounting the movable support carrying the registering rack that during the time of disengagement the rack and its actuator move away from the counter practically as one piece without any relative movement between the two, and the subject matter of such construction has been broadly claimed in said prior application. The same general principle is used in the present application; but in the prior application the movable frame was swung upon a different center from that upon which the key actuator was mounted, and it will be apparent that if there is any extended combined movement about these different centers, the registering frame and its actuator will, after they have each moved a certain distance about their respective centers, no longer move without any movement relative to each other. In the prior application the extent of movement of disengagement was so small that this difference in the centers of movement of the rack and the actuator produced no appreciable effect as far as relative movement between the two was concerned; but in order completely to obviate this difficulty I have now in the present application adopted a construction whereby the registering segment supporting frame is mounted to swing upon the same center that the actuator (that is the key itself) swings upon, this center being the shaft 5 upon which the so-called counter engaging frame is pivoted and also upon which the keys themselves are pivoted. Thus it will be seen that in the present construction, as soon as the support to the counter engaging frame is withdrawn by the lateral shifting movement of the key coupler, and the registering segments are then supported by the pressure of the keys themselves, then as the key starts to return toward normal position the counter engaging frame and the key drop together practically as one piece and since there is thereby no relative movement between the actuator and the pivotal point of the registering segment, there can be no rotary effect produced upon the segment, and the latter is disengaged from the counter without any binding effect due to such rotary movement; and since the counter engaging frame carrying the pivotal point of the rack is pivoted upon the same center as the keys these two parts will drop in the manner described without the slightest relative movement as far as it may be desired to allow the same to drop, until the counter engaging frame is brought to rest and the key moves on independently of the same, whereupon, because of this relative movement which now takes place between the key and the pivotal point of the registering segment, the segment is returned to normal position with the return of the key.

The segments remain out of engagement with the counter pinions during the entire return movement of the operated keys, and the rear ends of said keys in swinging downward, return the segments to normal position as above described; that is, until the registering frames contact with their stop-lugs 23$^a$, whereupon the latch-arms 28 spring into position to lock the segments. As soon as the registering frames are thus stopped the keys swing out of engagement therewith and return to normal position.

In order to cause the arms 25 to move back positively when released I provide each with a rigid return arm 25$^a$ (Fig. 8) having an upwardly extending nose 25$^b$ which coöperates with the lower portion of its respective cam-disk 34 and is thereby forced downward during the return movement of the keys. When in normal position the nose of the arm 25$^a$ shown, is out of alinement with the cam disk. At the end of the upward rocking movement of the key coupler when the cam is moved laterally with the shaft 20, a cam shoulder 34$^a$ formed thereon is thus brought into alinement with the nose 25$^b$ so that the return arm 25$^a$ will be rocked downward upon the backward movement of its cam 34.

The lateral shifting movement of the key-coupler frame, the counter-engaging cams and the shaft 20, which last simply slides in its bearings in the main frame, is effected by four beveled lugs, 37, 38, 39 and 40, (Fig. 6). The lug 39 is secured upon the inner side of the right-hand side-frame of the machine and has its beveled face on its downward side and in the path of a corresponding beveled lug 37 secured upon the right-hand side of the key-coupler. In like manner the lug 40 is secured to the inner side of the left-hand side frame of the machine in the path of the coöperating lug 38 secured upon the left-hand end of the key-coupler frame. The key-coupler frame and the parts which are shifted laterally with it are shown in normal position in Fig. 6. The operation of a key, however, swings the key-coupler upward and the beveled faces of the lugs 37 and 39 contact just before the end of the initial movement of the key-coupler, thereby the key-coupler frame and its parts are shifted to the left and the coupler-frame swings downward in its shifted position until the beveled faces of the lugs 38 and 40 contact, whereupon it is shifted toward the right to normal position.

It will readily be understood that the various parts which are herein described as secured to and movable laterally with the key-coupler, might well be secured to and moved by any other member of the machine organization which has a uniform movement at each operation of the machine.

If a key be operated violently there might be danger that the key-coupler would be swung upwardly and then shifted to the left with such velocity that on striking it would rebound to its right-hand position, and to prevent this I provide devices shown in Fig. 15 and in plan in Fig. 2. These consist of a lever 18$^a$ which is pivoted at its rear end to the inner side of the right-hand side-frame of the machine. Its forward end is bent at substantially a right angle and is held down upon the lug 39 by a coiled spring 18$^b$ which connects it with the side-frame. Now, when the key coupler is raised, the lug 37 striking the lug 39 continues to rise, but of course is shifted to the left so that at the end of the movement of the key-coupling frame, the angular end 18$^c$ of the lever 18$^a$ is squarely interposed between the stud 37 and the right-hand side-frame of the machine. The key-coupler frame cannot, therefore, rebound laterally to any extent.

The full-stroke device in my machine to compel a complete movement of the operated key in both directions, comprises a short segmental rack 41 which is formed on an upwardly projecting extension of the cam disk 34, (Figs. 1 and 15). This rack is at all times in mesh with a segment-pinion 42 which is journaled upon the transverse shaft 5. The teeth of the segment-pinion are made so wide, as shown clearly in Fig. 15, that the segment-rack 41 and the segment-pinion are at all times engaged despite the shifting of the cam disk 34, of which the segment-rack is an integral portion. Secured preferably to the hub of the segment-pinion is a segment-ratchet 42$^a$. It will readily be understood that at each operation of the machine, through the rack 41 and pinion 42, the segment-ratchet is swung to the front until it is entirely clear of the coöperating arrester pawl 42$^b$. It is then returned to normal position. The arrester pawl is held in engagement with the ratchet in both directions by its spring 42$^c$ which connects it with the main frame.

The indicator supporting frame 12 is rocked on its pivots 11$^a$ (Fig. 4) to release the indicators through a segmental pinion 130 formed thereon and meshing with rack-teeth 131 formed on the end of an operating lever 132. This operating lever is pivoted upon the main frame as at 133 and is formed at its inner end with bifurcated arms 134 and 135 which are better shown in Fig. 8. These arms are formed respectively with noses 136 and 137 which extend into proximity to the diametrically opposite sides of a compound cam, comprising two adjacent cam-disks 139 and 140 fast to the shaft 20. When the cam is in its normal position shown in Fig. 8 the disk 139 is in the same vertical plane with the noses 136 and 137 so that when the cam is rocked by the upward movement of the coupler it will force the arm 135 downward and thus rock the lever 132 and operate the indicator supporting frame 12 through the mechanism aforesaid to drop the exposed indicators. When the coupler and shaft 20 are moved laterally the disk 140 is brought into alinement with the noses 136 and 137 so that as the shaft 20 rocks back with the coupler the lever 132 is operated and rocked back to its normal position shown in Fig. 4. As the key coupler is elevated upon the operation of a key, a spring 43, which connects an arm 45 pendent from the coupler to the main frame, is put under tension to again return the parts to normal position when the keys are released.

The cash drawer 47 is suitably mounted in the casing so that when released it will be propelled from the same and to this end I provide an anti-friction roller 48 on one side of said drawer (Fig. 1). This roller is engaged by a lever 46 hung on the shaft 20 and connected at its lower end to a coil-spring 44 which is in turn connected to the frame. When the drawer is closed this spring is put under tension by the lever 46 being forced rearward. When the drawer is subsequently released it is forced out of the casing by the said lever which is swung forward by the spring 44. The lever 46 is further formed with a projection 150 having a beveled face, which, when the lever is forced back by the closing of the drawer contacts with a lug 151 formed on the key-locking lever 152 and swings it backward. The key-locking lever is hung from the shaft 29 and is normally forced forward to bring a shoulder 153, formed near its lower end, over the coupler bar 18, by a coiled spring 154 interposed between said lever and the main frame.

It will be observed from the above that as long as the cash drawer remains closed the shoulder 153 will be held out of the path of the bar 18 but just as soon as the forward movement of the drawer commences the lever 152 is released and is then forced forward by its spring into locking position over the key-coupler bar which of course prevents the operation of any of the keys. As it is sometimes desirable to so adjust the parts that the cash drawer may be left open without locking the keys I provide means for permanently holding the lever 152 in inoperative position irrespective of the position of the cash drawer. This means comprises a bar 155 formed at its rear end with a double hook 156 which engages the lever 152 (see Fig. 1$^a$) and mounted at its forward end to slide on the main frame by a screw 157 which projects through a bayonet slot 158 formed in said bar. When it is desired to hold the lever 152 out of operative position the bar 155 is first forced rearward and then laterally to bring the screw 157 in the forward portion of the bayonet slot to prevent the return of the bar under the stress of the spring 154 when released. The cash drawer, as before stated, is forced out of the casing when released by the drawer ejecting lever 46 and is normally held closed by a pivoted latch lever 50 which is forced down into position to engage the latch plate 51 mounted on the drawer by a coiled spring 52 interposed between said latch and the main frame. The latch is limited in its downward movement by a stop arm 53 formed thereon and contacting with the cross bar 7 of the main frame. The latch is operated to release the drawer upon the return or downward movement of the key-coupler, by an arm 54, formed on one of the disks 34, as shown in Figs. 1 and 15. When the coupler moves up and carries the disks 34 with it the arm 54 passes up beside the inner end of the latch 50 but when the coupler is moved laterally at the end of its upper stroke the arm is brought directly over the latch so as to operate the same upon its downward movement.

The registering segments 26 coöperate with the counter pinions 69, 70 and 71 which are actuated by the respective banks of keys, to turn them forward; they then become disengaged therefrom, (see Fig. 2). The pinion 69 of the units of cents wheel 72 is mounted fast upon one end of the units of cents shaft 73 which is suitably journaled upon the main frame. The turn-to-zero shaft 74 is suitably journaled in the counter frame, is in line with and preferably of the same size as the units of cents shaft, and their ends abut. The right-hand end of the turn-to-zero shaft projects through the wheel 72 and partly into the ratchet wheel 75 which is fast to said counter wheel. The counter wheels 76 and 77 are journaled upon the shaft 74 and are secured to and carried by the gears 70 and 71, as above described (see Fig. 2). Each counter-pinion 70 and 71 is also provided with a ratchet wheel 78 similar to the wheel 75. Each ratchet wheel is engaged by a spring-pressed pawl 79 suitably mounted on the counter frame, so as to prevent any backward rotation of the counter wheels (see Fig. 9).

The "transfer" from counter wheel 72 to counter wheel 76 and from the latter to counter wheel 77 is effected in the following manner. Each of the wheels 72 and 76 is provided with a transfer cam 80 as shown in Fig. 9. Each cam, when the wheel carrying it has made a complete revolution contacts with a tripping nose 76ª formed on a pivoted spring-pressed trip pawl 77ª and forces said pawl back against the tension of its spring to cause the retaining nose 78ª formed on its lower end to disengage from a cam projection 79ª mounted on a transfer pawl 80ª. Of course a machine, which, like my present invention, has three banks of keys, will employ two complete sets of the transferring devices, as shown in Fig. 9,— one set to transfer amounts from the units-of-cents wheel to the dimes wheel and the other set to transfer from the dimes wheel to the dollars wheel. A description of one set, however, will suffice for both as they operate in substantially the same manner.

As cash registers have heretofore been constructed much trouble has been met on account of the fact that the transfer pawl, when a registration is made with unusual violence, would be tripped prematurely. For instance, suppose that the amount recorded would normally and properly bring the transfer cam to the "nine" position, that is, just one notch from its transferring position. Now, if the operation of the machine which brings the transfer-cam to its "nine" notch be made with sufficient force or violence, the transfer cam might easily be thrown a little beyond its "nine" position— not indeed to its "zero" or transfer position, but yet far enough to contact with the tripping nose and thus operate the trip pawl. In most of the machines in the prior art when this overthrow occurs the trip pawl is simply left in its tripped position and the transfer takes place before, so that the amount is improperly registered. I guard against this by providing the trip pawl with a resetting nose, or other means, whereby if the transfer cam has been overthrown and the trip pawl tripped before it should be, the transfer cam in settling back to its proper position under the impulse of its spring which actuates the retaining pawls 79, will strike resetting nose 81 and return the trip pawl to its proper position. So that no harm is down by overthrowing the transfer cam unless it be overthrown an entire notch, or so far that the retaining pawl 79 will not be able to throw its ratchet 78 and the transfer cam movable therewith, back to its proper normal position.

The transfer pawls 80ª are arranged to be reciprocated at each operation of the machine. Normally, and especially when transfer is to be made, the transfer-pawls are by the trip pawls held in so low a position that when reciprocated they do not affect the counter wheels because they do not contact with them. When, however, the transfer cam holds the trip pawl in abnormal position, a spring 82 swings the transfer-pawl upward, and when subsequently reciprocated it engages the teeth of the ratchet 78 and turns the counter wheel one notch. Each transfer-pawl is pivoted at its front end to the upper end of one of the two pawl-carrying arms 84. Suitable coiled springs 84ª interposed between the pawl-carrying arms and the counter frames, shown in Fig. 9, quickly return the transfer pawls to their normal position, as there shown, when they have been displaced by devices to be now described.

For the purpose of actuating the transfer pawls two actuating arms 85 are secured upon the key-coupler and are laterally shifted therewith. Their position is such that during the initial upward swinging of the key-coupler the studs 86 upon the ends of the actuating arms are out of alinement with the operating projection 86ª upon the pawl-carrying arms. At the end of its primary movement, the key-coupler is shifted, as already described, so as to bring the studs 86 squarely in alinement with the operating projections 86ª during the return or downward movement of the key-coupler, and said studs contact with the operating projections, as described, during the return movement of the key, thereby reciprocating both the transfer-pawls. Of course the operating projections 86ª on the pawl-carrying arms are arranged different distances from the pivot point of said levers so that the transfer-pawls will be actuated successively in the usual manner. When a transfer pawl has been tripped it automatically resets itself in the act of making the transfer, as, by the turning of the counter wheel it is gradually forced downward to its normal position so that the trip-pawl can be thrown by its spring into its normal position shown in Fig. 9.

The above described transfer devices only relate to the primary counter wheels or those receiving motion directly from the segments 26 and I will now pass on to the remaining counter wheels 87 and their transfer devices. These wheels of any desired number according to the desired capacity of the counter but in the present instance there are three of them, are also journaled upon the shaft 74 and are provided respectively with gear wheels 88, locking disks 89, and transfer disks 90, as shown in Figs. 12 and 16. The units of dollars counter wheel 77 is also provided with a locking disk 89 and a transfer disk 90 as better shown in Fig. 13. Each of these transfer disks comprises a single gear tooth 90ª and each of the locking disks has a notch 90ᵇ corresponding in position with the tooth of its respective transfer disk (see Fig. 16). Coöperating with the gear wheels 88 are a series of transfer pinions 91 (Figs. 2 and 12) journaled on a shaft 91ª which is mounted in a yoke shaped disengaging frame 90ᶜ (Fig. 10) suitably pivoted upon the counter frame on the short transverse shaft 90ᵈ. Each gear wheel 91 is provided with a locking star wheel 92 having a scalloped edge adapted to engage the periphery of its respective locking disk 89 to lock the gear wheel against operation (see Fig. 12).

Each of the counter-wheels 87, except the one at the left-hand end of the counter, has rigidly secured to it upon its right-hand side its gear wheel 88, and upon its left-hand side its locking disk 89 and transfer disk 90. The transfer-disk of one wheel is concentric and side by side, with the gear 88 of the next higher counter-wheel, and as shown in Fig. 16, the combined width of the tooth of the transfer disk and teeth of the gears 88, is just equal to the width of the transfer pinion 91. Therefore, if one of these counter-wheels 87 be turned sufficiently, the tooth of its transfer disk will engage the transfer-pinion and will turn the latter one notch, thereby turning the gear 88 of the next higher registering wheel, which gear is also in engagement with the said transfer pinion, one notch. Of course normally the star-wheel locks the coöperating counter-wheel, but at the time when this transfer movement is effected the notch 90ᵇ of the locking disk has been turned so that a point of the star-wheel can project therein, thereby temporarily unlocking the locking disk 90 to permit the star-wheel of the transfer pinion carried by it to be turned one notch.

The resetting devices for turning the counter-wheels to zero are all operated by simply turning the thumb button 110, which operates, first, to entirely disengage the transfer pinions 91 and the star-wheels from the counter-gears and locking disks; second, to rock the springs 95ª into engagement with their respective counter-gears, and third, as the shaft 74 is turned, the radial wall of its longitudinal groove 94 will engage the spring-pressed pawls 95 (broken lines Fig. 9) one of which is pivoted on each counter-wheel, and thus said wheels will be picked up and turned to zero in a manner, which in its general features is well known in the art.

For the purpose of readily permitting their disengagement from the counter-gears, etc., the transfer-pinions 91 and the star-wheels 92 are all mounted on the shaft 91ª carried in the lower swinging end of the disengaging frame 90ᶜ. Near the lower end of its left-hand arm (Fig. 10) said frame is provided with a disengaging tooth 90ᵉ, which normally fills a correspondingly shaped notch 90ᶠ in a disengaging disk 90ᵍ which is rigidly secured upon the shaft 74, Figs. 2 and 10. It follows from the construction just described that the initial turning of the turn-to-zero shaft 74 causes the disengaging tooth 90ᵉ to ride out of its notch, thereby disengaging the transfer pinions, etc., and the tooth will ride upon the periphery of the disengaging disk until the latter and its shaft have made a complete revolution, whereupon, as soon as the tooth has reached the mouth of the notch 90ᶠ, the spring 90ʰ which is interposed between a portion of the frame 90ᶜ and the counter-frame, promptly turns the transfer-pinions and star-wheels again into engagement with the counter-gears, etc.

As before suggested, the springs 95ª are rocked so as to be brought into engagement with the teeth of the counter-gears by the operation of rocking out the transfer-pinions and star-wheels. To this end it will be seen that said springs are secured upon a rock frame 108, shown in Figs. 9 and 11. The rock-frame is pivoted upon a short transverse shaft 108ª which is secured in the counter frame, and upon which the transfer-pawls 80ª normally rest and slide. The rock-frame is further provided with a coiled spring 108ᵇ interposed between it and the fixed portion of the counter-frame, so that the springs 95ª are normally held away from the teeth of the counter-gears. A spur 108ᵉ which is formed integral with the rock-frame extends down and under the swinging end of the disengaging frame 90ᶜ, shown in broken lines in Fig. 9. As the disengaging frame therefore is swung rearwardly, it swings all of the springs 95ᵃ into engagement with their respective counter-gears and thereby puts sufficient tension on the counter-wheels to prevent their moving improperly during the turn-to-zero operation. When the disengaging frame returns to normal position the spring 108ᵇ promptly throws the springs 95ᵃ out of engagement with the counter-gears.

For the purpose of automatically stopping the shaft 94 when the counter wheels have arrived at zero position, I have pivoted a stop-pawl 115 upon the left-hand end of the disengaging frame (Fig. 10). This stop-pawl has a notched front end 115ᵃ which is normally held out of the path of a stop-pin 116 carried by the disengaging disk 90ᵍ. In the operation of resetting the counter-wheels to zero the downward rocking of the disengaging-frame 90ᶜ brings the notched end of the stop-pawl squarely into the path of the stop-pin 116, so that thereby the shaft 74 and the counter-wheels carried thereby are automatically stopped in zero position. Of course if the tooth 90ᵉ of the disengaging frame reënters its notch in the disengaging disk, the stop-pawl is again thrown upward out of the path of the stop-pin and the counter may again be turned to zero whenever desired.

The machine is provided also with printing devices, by means of which each transaction as it is registered, is printed upon a detail strip 206 (Fig. 5). To this end the machine, as shown, is provided with three grids or slotted, endwise-sliding plates 162, that is, one for each bank or denomination of keys and which I shall hereafter designate "printer operating plates." Three printing wheels or type-carriers 175 are also provided, one for each bank of keys, and each type-carrier is connected, as hereinafter described, to its corresponding slotted plate. The type-carriers are adjusted to printing position directly from the keys and to this end each printer-operating plate (Fig. 3) is provided with a series of ten cam-slots 161, directly beneath which respectively extend the rear ends 160 of the nine cash or value keys and one special key. Approximately half of these slots incline in one direction and half in the other. Preferably these cam slots at their entrance are straight and vertical for a distance about equal to the width of the rear end of the key; then the slot is inclined a varying distance according to the numerical value of the operated key. The upper or closed end of the slot is also straight and vertical to accommodate the width of the key. It will be noticed also that the inclined portion of the slot is wider than the rest of it, to accommodate the width of the keys when operated.

I attach considerable importance in a machine which like mine has type carriers, to the idea of inclining the slots in two directions as thereby less movement is required to adjust the type carriers to printing position than if the slots were all inclined in the same direction as in machines of this line heretofore built. Another and very important advantage is that as the type carriers have less distance to move I am able to avoid the excessive momentum that can be imparted to the type carriers where the printer-operating plates have a greater sliding movement. By increasing or lessening the straight portions of the slots I can vary at will the time allowed for setting the type wheels, operating the platen, etc., and this is a very considerable advantage.

Each of the printer-operating plates is swung from two supporting link bars 164 pivotally secured to said plate at their upper ends to the main frame. In order to prevent any accidental movement of any one of the plates before a key has been operated and to lock said plate in position, I provide locking plates 165, each of which is journaled upon a transverse rock-shaft 166 and is provided at its upper end with an upwardly-projecting arm 167 carrying a forwardly-projecting locking-pin 168 which is arranged to enter an aperture 169 formed in its respective register operating plate 162 to lock the latter against longitudinal movement until a key is properly operated. Each of the locking-plates 165 is normally forced forward into its locking position by a coiled spring 170 which surrounds the shaft 166 and engages the plate 165 at one end and one of the brackets 171 which support the shaft 166, at its opposite end (see Fig. 3). As better shown in Figs. 1 and 4, each locking plate 165 is formed with a horizontal shoulder 172 which normally lies above the rear of the keys of its particular bank. It therefore follows that when one of the keys is elevated it will strike the shoulder 172 and thereby force the locking plate 165 rearward to disengage the pin 168 from its respective printer operating plate 161.

In order to prevent any movement of the locking plates while the key-coupler remains in its lower position and to return said plates to normal position upon the return of the coupler, I provide the rock-shaft 166 with a rigid forwardly-projecting arm 173 which projects under the coupler so as to be normally held down by the same (as shown in Fig. 4), and rigid arms 174, which project up behind the plates 165 and engage the same. When the key-coupler is raised by the initial operation of a key the arm 173 is released and the shaft 166 is thus left free so that the arms 174 may be rocked back by the rearward movement of any of the plates 165. This construction prevents any manipulation of the locking plates without a regular operation of the machine.

For the purpose of transmitting the variable movement of the printer-operating plates to their respective type-carriers, I provide three rack-bars which are pivoted at their left-hand ends to the printer-operating plates respectively. At their right-hand ends the racks are held from displacement by the guide plate 178 rigidly secured to the main frame. The teeth 177 of these rack-bars engage respectively three pinions 179, 180 and 181, which in turn are connected to the several type carriers (Fig. 17). The rearmost rack bar, which is pivoted to the dollars printer-operating plate, is in mesh with the rearmost pinion, which is rigid upon the rear end of the forwardly extending shaft 182. The middle rack bar, or that one which is connected to the dimes printer-operating plate, is in mesh with the pinion 180 fast upon the inner sleeve 183 which surrounds the shaft 182. The inner rack-bar meshes with the pinion 181 which is fast upon the rear end of the outer sleeve 184. The sleeves and the printer shaft 182 are all supported between their ends by the bracket 180ª secured to the main frame and the printer frame 185. The three printing wheels or type carriers 175 are respectively secured upon the front ends of the printer shaft and the two sleeves, Fig. 17, the dollars printing wheel being upon the left, the cents printing wheel upon the right, and the dimes printing wheel between the other two.

Each printer wheel is provided on the lower half of its periphery with ten printing types ranging from "0" to "9", the "0" being in the middle and the other numerals being arranged on each side thereof, Fig. 17ª, so that when some of the printer wheels are in normal position when the machine is operated, they will print "0" upon the detail strip. It will be readily understood that the arrangement of the printing types corresponds to the arrangement of the cam-slots in the printer-actuating plates.

For alining the printing types to exact printing position I provide the upper half of each printer wheel with a series of ten alining notches 182ª (Fig. 3) and at the proper time during the operation of the machine, and before the platen drives the paper against the printing types, the alining bar 183, which is carried by the bell-crank alining lever 184ª, is forced down into the alining notch directly beneath it. To accomplish this result the lower arm of the alining lever is provided with a cam-slot 186, through which extends a pin 187 secured to and projecting rearwardly from a straight operating lever 188, which is pivoted between its end upon the outer printer wheel sleeve 184. The inner end of the operating lever extends within the machine into the path of the universal bar or key-coupler frame (Figs. 1 and 3) so that at each operation of the machine and before the end of the initial movement of the key, the key-coupler frame will strike the inner end of the operating lever 188 and raise it, thereby swinging the pin 187 downward and rocking the alining bar into the alining notches, where it is held until after the printer hammer has driven the detail strip against the printing types. When disengaged from the key-coupler the operating lever, and consequently the alining bar, is restored to normal position by the coiled spring 190, which is connected at one end to a pin 189 secured to the operating lever, and at the other end to the fixed frame of the machine.

The flexible platen 191 for effecting the printing of the detail strip, is mounted in the end of a pivoted lever 192 mounted on the main frame (see Fig. 5). This platen lever is normally drawn upward by a coiled spring 193 and is provided with an upwardly projecting nose 194 which is arranged to be engaged and depressed by a cam arm 195 mounted upon the projecting end of the shaft 20. The platen lever is depressed to its full extent and then released during the upward movement of the coupler. The cam-arm 195, it will be understood, being fast upon the shaft 20, is movable and shiftable therewith. During the upward movement of the coupler, therefore, the cam-arm is swung downwardly and rearwardly, depressing the platen arm to its full extent. Then the cam-arm is shifted to the left with the key-coupler, and the platen-arm being thereby released, springs upward to normal position under the impulse of its spring and drives the detail strip against the printing type. As it reaches normal position, the platen-arm contacts with its stop 192ᵈ, but it is to a degree flexible and the momentum carries the platen beyond normal position and against the paper strip, which it drives against the printing types. The platen then springs back to normal position.

For the purpose of feeding the detail strip from its supply roll and winding it upon its storage roll 204 a certain amount at each operation of the machine, I provide the rear end of the platen-arm with an anti-friction roller 197 (Fig. 3) which projects through a vertical slot 198 formed in the printer frame and engages the upper end of the pivoted feeding pawl 199, which is pivoted between its ends at 199ª. At its lower end it carries a pivoted feed pawl 200 which is provided with a stop pin 201, and a coiled spring 202 holds the feed pawl in normal position against the stop pin. This spring also serves to return the feed lever to normal position with its upper inclined edge against the roller 197ᶜ when displaced therefrom. The feed pawl at its right-hand end engages a ratchet-wheel 203 which is secured upon the shaft which carries the storage roll 204. A spring-pressed retaining pawl 205 prevents retrograde movement of the storage roll. It results from this construction that whenever the hammer is operated, the roller 197 in passing downward, swings the upper end of the feed lever to the left and thereby advances the detail strip so as to present a fresh portion thereof under the printing types. The spring 202 then returns the feed lever to normal position. As it is sometimes desirable to turn the detail strip forward independent of its regular movement, I provide the shaft of the storage roll 204 with a metal thumb-nut 209.

For the purpose of securing an impression from the types an endless inking ribbon 225 is employed. The ink ribbon passes over three guide rollers 226 mounted on the printer frame and also over a curved guide plate 227. The ribbon of course, passes between the types and the platen and is fed forward upon each operation of the machine by a toothed wheel 228 fast to one of its rollers 226 as better shown in Figs. 5 and 5ᵃ. The toothed wheel is operated by a spring pawl 229. which engages the same and is pivoted upon the main frame. This pawl is provided with a pin 230 which projects through an aperture in the main frame so as to be struck and operated by the key coupler to elevate the pawl and thus feed the ribbon. Any suitable form of removable cabinet or hood may be placed over the printer and coöperating parts.

As it is sometimes desirable to permit the operation of the registering devices and at the same time to prevent the operation of the printing devices, I provide a pivoted latch lever 192ᵇ, which normally rests, as shown in Fig. 5, against its stop pin 192ᶜ, being held there by the coiled spring 192ᵈ. When it is desired, therefore, to prevent the operation of the printing devices, the proprietor, or other authorized person, may hook the latch-lever over the headed pin 192ᵃ which is carried by the platen-lever and thereby the platen-lever will be held in its lowermost position and the printing be prevented until the said lever is again released.

A bell 121 is mounted rigidly upon a vertical standard 122 formed on a plate 123 which is pivoted as at 124 upon the main frame and formed at its opposite end with an elongated slot through which a bolt 125 passes to secure that end of the plate movably to the main frame (see Figs. 2 and 2ᵃ). A screw or bolt 126 is mounted in the standard 122 and is formed with an upper thumb nut by which the bolt may be operated. Two spaced recesses 127 and 128 are formed in the frame in proximity to the standard 122 so that the plate 123 may be moved backward or forward and locked in its adjusted positions by the bolt being screwed down into one or the other of the recesses. This movement of the plate 123 is to bring the bell into or remove it out of the path of action of a bell clapper 129. This clapper is suitably pivoted to a bracket hung from the main frame and is normally drawn forward by a coiled spring 130 which connects it to the main frame. The lower end of the clapper or hammer is formed with a lateral projection 131 which is arranged to be struck by an arm 132 fast to the shaft 20 and having a laterally projecting lug 133. As the key-coupler rises the arm 132 is rocked downward and contacting with the projection 131 draws the clapper back against the tension of its spring. When the shaft 20 moves laterally at the end of the upward stroke of the coupler the lug 133 rides out on the lug 131, the arm 132 passing out of alinement with the projection 131. As the coupler commences its backward movement the lug 133 passes free of the projection 131 and allows the clapper to spring back and sound the bell.

In all cash registers heretofore produced in which a series of keys is employed to control the operating mechanism, nine times as much movement is transmitted to some of the operating parts when the "9" key is operated as when the "1" key is pressed, etc., and of course, therefore, the "9" key will press somewhat harder than any of the other keys in the same bank. In all machines having a printing attachment, as heretofore built, also, to print the character "9" upon a check or detail strip, the type carrier is moved nine times as far as to print the character "1" and, therefore, in machines such as I have described as heretofore constructed, where the differential movement of the registering mechanism as well as that of the printing mechanism is controlled by the keys, it has been found that it is considerably more difficult to print and register with the keys of higher denominations than with those of lower value. I have in my machine to an extent corrected this fault, as will be readily understood, because, in my machine none of the keys move the type carriers more than five spaces, and the "9" key moves it only a single space, while some of the keys of lower denomination move it a greater distance. Therefore, the power required to operate the machine is practically the same regardless of which value keys may be pressed. This feature of my invention is equally applicable to machines in which the operation of the keys simply serves to set or determine the extent of movement of the registering devices, and in which the operation of the machine is accomplished by means of a crank, lever, or other actuating means.

Where the expression "accounting devices" has been used in the claims, it is intended to mean any sort of devices whereby an account may be kept of the amounts of the transactions whether such devices be counters or printers.

Certain of the inventions contained in the machine set forth in the present application are also embodied in the machine described in the previously mentioned prior application filed by me on Sept. 30, 1898, Serial No. 692,298; and it is intended to claim broadly in said prior application the inventions common to these two cases including the novel arrangement of the registering racks with reference to the counter and to the actuating devices, and also the construction which concerns the peculiar method of disengagement of the registering racks from the counter.

Having thus described my invention what I claim as new and desire to secure by Letters Patent is:

1. In a cash register, the combination with a series of keys, of a laterally movable rocking member common to and actuated by any of said keys, a rock-frame, cams actuated by the movable member for rocking said frame, a counter, and counter-operating devices mounted on the rock-frame.

2. In a cash register, the combination with a series of keys, of a laterally movable rocking member common to and actuated by said keys, a rock-frame, cams carried by the common member for rocking said frame, a counter, and counter-operating devices mounted on the rock-frame.

3. In a cash register, the combination with a series of keys, of a movable member common to and actuated by the keys, a rock-frame, cam disks carried by the common member and which support the rock-frame in normal position, a counter, counter-operating devices normally out of engagement with the counter and mounted on said rock-frame; said disks or cams being arranged to hold the counter operating devices normally disengaged, but to bring them into engagement with the counter during a part of the registering operation and to finally permit movement of the counter operating devices back to normal disengaged position after the end of the registering movement.

4. In a cash register, the combination with a series of keys, of a counter, transfer devices for said counter, a member common to and moved by the keys in one direction, means for shifting said member in another direction, and operating devices mounted on the common member and coöperating with the transfer devices when moving in one direction only.

5. In a cash register, the combination with a series of keys having an initial and a final movement, of a counter, transfer devices for said counter, a member common to and moved by the keys in one direction, operating devices for the transfer devices mounted on said common member, and means arranged to shift the common member so that the operating devices will actuate the transfer devices during one movement only of the keys.

6. In a cash register, the combination with a series of keys, of a counter, transfer devices for said counter, a member common to and moving with the keys and actuating arms mounted on said member and contacting with the transfer devices only when moving in one direction.

7. In a cash register, the combination with a series of keys, of a counter comprising transfer pawls and pawl-carrying arms, a member common to and moved by the keys, actuating arms secured to and movable with the common member so as to engage the transfer arms only when moving in one direction and actuate the transfer pawls during each operation of the machine.

8. In a cash register, the combination with a series of keys, of a movable member common to said keys and having a definite movement at each operation thereof, means for shifting said common member during its said definite movement, a counter, transfer-operating devices, and actuating means for said devices mounted on the common member and arranged to be brought into operative position when the common member is shifted.

9. In a cash register, the combination with a series of keys, of a movable member common to said keys, means for moving said member laterally during its stroke, cams on said member arranged to be moved out of operative position by the shifting of the member, a counter, and counter-operating devices arranged to be moved into connection with the counter by said cams.

10. In a cash register, the combination with a series of keys, of a movable member common to said keys and having a definite movement at each operation thereof, means for shifting said member during its said definite movement, cams carried by said common member, a counter, and counter-operating devices which are normally supported by said cams and are arranged to be thereby brought into engagement with the counter wheels, said cams being shifted with the common member at a predetermined time so as to permit the counter operating devices to drop out of engagement with the counter wheels.

11. In a cash register, the combination with a series of keys, of a key-coupler, means for moving said coupler laterally during its stroke, cams on said coupler arranged to be brought to operative position by the shifting of the coupler, a counter, and counter-operating devices constructed to be shifted into connection with the counter by said cams.

12. In a cash register, the combination with a series of keys, of a movable member common to said keys, means for shifting said member during its regular movement, a counter, a rock-frame carrying counter-operating devices, and means mounted on the common member for moving said rock frame.

13. In a cash register, the combination with a counter including transfer devices, of a series of keys, a movable member common to and moved by said keys and having a fixed definite movement during the operation of any of the keys, means for shifting the common member twice during each operation of the register and projections on the common member which alternately move into and out of the path of the transfer devices so as to actuate them once during every operation.

14. In a cash register, the combination with a register including transfer devices, of a main frame, a series of keys supported in the frame, a movable member common to the keys and moved thereby, fixed lugs or projections arranged to shift the common member after the beginning of its movement and shift the second time before the end of said movement, said common member being thus arranged to be moved alternately into and out of the path of said transfer devices so as to actuate them once during every operation of the machine.

15. In a cash register, the combination of a main frame, a series of keys, a movable member common to said keys and moved thereby, projections on the frame adapted to be struck by said movable member to shift it, a counter, counter-operating devices, and means operated by the common member for bringing the counter and counter-operating devices into operative relation.

16. In a cash register, the combination with a series of keys, of a movable member common to all of said keys, devices for shifting said member while it is being moved by said keys, an alarm, a sounding device for said alarm, means connected to the common member for sounding the alarm and means for moving the alarm out of the path of the sounding device.

17. In a cash register, the combination with a series of keys, of a movable member common to all of said keys, devices for shifting said member while it is being moved by said keys, a counter, transfer devices for the counter, and actuating arms connected to the movable member for actuating the transfer devices.

18. In a cash register, the combination with a counter, of a counter operating member, a printer, a printer operating member, a series of keys common to said members for actuating the same, a locking device for the counter actuating member, and an independent locking device for the printer actuating member, both of said devices being operated by the initial movement of the keys; the construction being such that the larger denominational movements of the counter are accompanied by correspondingly smaller degrees of movement of the printing devices.

19. In a cash register, the combination with a series of keys, of a vertically and laterally movable member common to said keys and adapted to be actuated thereby, a rock-frame actuated by the common member, registering frames mounted on the rock-frame and arranged to be engaged directly by the keys, and a counter operated by the registering frames.

20. In a cash register, the combination with a series of keys, of a vertically and laterally movable key-coupler, a rock-frame moved by the coupler, counter-operating frames mounted on the rock-frame and adapted to be engaged directly by the keys, and a counter operated by the counter operating frames.

21. In a cash register, the combination with a series of keys, of a member common to and movable by said keys, a series of registering frames operated by said keys, and hooks connecting said frames to the common member for returning the frames with the common member to normal position.

22. In a cash register, the combination with a series of keys, of a member common to and moved by said keys, actuating arms mounted on said member, means for shifting said member, a counter, transfer pawls for said counter, and pivoted levers for operating said pawls arranged to be operated by the actuating arms when said arms are moving in one direction only.

23. In a cash register, the combination with a counter, of a series of operating keys for giving the counter graduated movements; type carriers arranged to be moved in opposite directions from normal position; and means controlled by the keys for moving said type carriers in opposite directions to proper setting position, said means being so constructed that the larger graduated movements of the counter are accompanied by correspondingly smaller degrees of movement of the type carrier.

24. In a cash register, the combination with a counter, of a counter operating device having graduated movements; a type carrier having graduated movements in both directions from normal position; a type carrier operating device; and a series of keys common to said devices for operating both of the same, these two devices being so constructed co-relatively that the larger denominational movements of the counter operating device are accompanied by correspondingly smaller degrees of movement of the type carrier operating device.

25. In a cash register the combination with a counter, of a series of operating keys for the same, a printing mechanism including type carriers, cam slotted plates connected to the type carriers and arranged to be operated by the keys; the construction being such that the larger denominational movements of the counter are accompanied by correspondingly smaller degrees of movement of the type carriers.

26. In a cash register the combination with a counter, of a series of operating keys for the same, a printing mechanism including type carriers, a series of differentially slotted plates intermediate the keys and type carriers; the construction being such that each slotted plate is moved in opposite directions in such manner as to equalize the force required to simultaneously operate the counter and the said type carriers.

27. In a cash register the combination with a series of keys, of a laterally movable rocking member common to and actuated by any of said keys; a rock frame; cams carried by the movable member and by the lateral movement thereof positioned to control the rocking of said frame; a counter; and counter operating devices mounted on the rock frame.

28. In a cash register the combination with a series of keys, of a counter, a rock frame, devices intermediate the keys and said frame for operating the latter, a series of registering frames mounted in the rock frame and each comprising a registering rack segment and a rigid bar arranged to be engaged directly by the key whereby said registering frames are actuated directly from the keys and in proportion to the value of the key operated, and means for engaging said registering frames with said counter.

29. In a cash register the combination with a series of keys, of a counter, including a series of transfer elements, a laterally movable member arranged to be operated by the keys and a series of operating projections on said member which are brought into or removed from operative relation with the transfer devices by the lateral movement of said member.

30. In a cash register the combination with a series of keys, of a counter, a member common to all of the keys, stationary cams arranged to force the member laterally when it is moved vertically by the keys and counter actuating devices moved into engagement with said counter by the said common key member.

31. In a cash register the combination with a series of operating keys, of a member common to all of said keys and arranged to be moved vertically by the same, cams for moving the said member laterally by its vertical movement, a counter, counter actuating devices, and means for controlling the engagement and disengagement between the counter and the counter actuating devices by the vertical and lateral movements of the member.

32. In a cash register, the combination with a series of keys, of an accounting device, a member common to all of the keys, stationary cams arranged to force the member laterally when it is moved vertically by the keys, and actuating means for the accounting devices controlled by said common key member as to operative engagement or disengagement between them and the accounting device.

33. In a cash register, the combination with a series of operating keys, of a member common to all of said keys and arranged to be moved vertically by the same, stationary cams for moving the said member laterally by its vertical movement, an accounting device, and actuating means for the same controlled by the vertical and lateral movements of the member as to operative engagement or disengagement between said actuating means and said accounting device.

34. In a cash register, the combination with a series of keys, of a vertically and laterally movable member common to all of the keys, a counter, and operating devices for said counter, a rock frame carrying the counter operating devices, and means for operating the rock frame from the laterally and vertically movable member.

35. In a cash register, the combination with a counter, of counter operating devices, a series of keys, a laterally and vertically movable member common to said keys, and means operated by said member in its vertical movement for bringing the counter and counter operating devices together, said means controlled by the lateral adjustment of said member.

36. In a cash register, the combination with a counter, of counter-operating devices, a series of operating keys, a key coupler common to said keys and having vertical and lateral movements, and means controlled by the key coupler in its vertical movement for bringing the counter and counter operating devices together, the operativeness of said means being controlled by the lateral adjustment of said member.

37. In a cash register, the combination with a counter, of a movable frame, counter operating racks mounted in said frame, a series of keys, a movable member common to all of said keys and having both vertical and lateral movements, and an operating means for said frame actuated by said movable member.

38. In a cash register, the combination with a key and a counter; of a reciprocatory member actuated by said key; a counter actuating mechanism arranged to be operated by said member; and means for shifting said member out of lateral operative alinement with said counter actuating device.

39. In a cash register, the combination with a series of keys and a register, of a movable member common to said keys and having a compound movement; and register actuating mechanism operated by said common member during one portion of its compound movement, with provisions for giving said member its other direction of movement and thereby displace it from operative lateral alinement with said register actuating mechanism.

40. In a cash register, the combination with a series of keys and a register, of a movable member having vertical and lateral movements by said keys; register actuating mechanism; and means connected with said movable member for operating said register actuating mechanism during one of its directions of movement, with provisions for giving said member its other direction of movement whereby to displace said member from coöperative lateral alinement with said register actuating mechanism.

41. In a cash register, the combination with a series of keys and a counter, of a movable member common to said keys and having a compound movement; the resultant of forces applied in different paths counter operating devices controlled by said keys; and means for controlling the engagement and disengagement between said counter and said counter operating devices by means of the compound movement of said common member.

42. In a cash register, the combination with a series of keys and a counter, of a member common to said keys and having both a vertical and a lateral movement; counter operating devices controlled by said keys; and means for effecting engagement between said counter and said counter operating devices by the vertical movement of said common member and for permitting disengagement upon the lateral movement of said member.

43. In a cash register, the combination with a series of keys and a counter, of a member common to said keys and having both a vertical and a lateral movement; counter operating devices controlled by said keys; and means requiring the combined vertical and lateral movements of said member for effecting successive engagement and disengagement between said counter and said counter operating devices.

44. In a cash register, the combination with a series of keys and a counter, of a member common to said keys given both a vertical movement and a lateral movement by the movement of said keys; counter operating devices moved graduated distances by said keys; and means for effecting engagement between said counter and said counter operating devices by the vertical movement of said common member, with provisions permitting disengagement upon the lateral movement of said member.

45. In a cash register, the combination with a series of keys and a counter, of a member common to said keys given both a vertical and a lateral movement by said keys; counter operating devices given graduated movements by said keys; a movable frame for supporting said counter operating devices; means for moving said frame by the vertical movement of said common member, to effect engagement of the counter operating devices with the counter, with provisions permitting disengagement of the counter operating devices from the counter upon the lateral movement of said common member.

46. In a cash register, the combination with a counter, of a reciprocating registering rack for engaging said counter; a series of pivoted reciprocating keys for actuating said rack, the latter being arranged to accompany said keys during both directions of their reciprocatory movements, a movable frame for supporting said rack mounted upon a pivotal point concentric with the pivotal point of said keys; and means for moving said supporting frame in such manner as to carry said rack into engagement with said counter.

47. In a cash register, the combination with a counter, of a reciprocating registering segment for engaging said counter; a series of pivoted reciprocating keys for actuating said segment, the latter being arranged to accompany said keys during both directions of their reciprocatory movements; a movable frame for supporting said segment, said frame being mounted upon a pivotal point concentric with the pivotal point of said keys; and means controlled by the keys for moving said frame in such manner as to effect engagement and disengagement between said segment and said counter.

48. In a cash register, the combination with a counter, of a reciprocating register- ing segment for engaging said counter; a series of pivoted reciprocating keys formed with provisions for positively engaging said segment during both directions of their reciprocatory movements; a movable frame for supporting said segment, said frame being mounted upon a pivotal point concentric with the pivotal point of said keys; and means controlled by said keys for moving said frame and thereby effecting engagement and disengagement between said counter and said segment.

49. In a cash register, the combination with a series of keys and a counter having transfer elements, of actuating mechanism for said counter; a transfer pawl and means for actuating the same; and a trip latch controlling the position of the transfer pawl, with provisions carried by said trip latch to prevent premature tripping of the same by an overthrow movement of the tripping element of the counter.

50. In a cash register, the combination with a series of keys, of a counter including transfer elements therefor, an actuating mechanism for said counter; a transfer pawl and means for actuating the same; and a trip latch for controlling the position of said transfer pawl and formed with a re-setting nose for engaging the tripping element of said counter and preventing premature tripping of said latch upon overthrow movement of said tripping element.

51. In a cash register, the combination with a series of keys and a counter, of a member common to said keys and having both a vertical and a lateral movement; counter operating devices controlled by said keys; and an arrester member for arresting said common member and moved thereby during only one of the two directions of movement of said common member.

52. In a cash register, the combination with a series of keys and a counter, and counter operating devices controlled by said keys; of a key coupler given vertical movement by said key; means for shifting said key coupler laterally; an arrester member actuated only by the vertical movement of the key coupler; and an arrester pawl for engaging said arrester member.

53. In a cash register, the combination with a series of keys and accounting devices, of a member common to said keys and having a compound movement, the resultant of forces applied in different paths, and means connecting said movable member with both said accounting devices and said keys for controlling the accounting devices from the keys by means of the compound movement of said member.

54. In a cash register, the combination with a series of keys and accounting devices, of a member common to said keys and having a compound movement, the resultant of forces applied in different paths, means connecting said movable member with both said accounting devices and said keys for controlling the accounting devices from the keys by means of the compound movement of said member, and a full stroke device operable on said movable member during only one portion of its compound movement.

55. In a cash register, the combination with a series of keys, and a member common to and moved in two planes by any of said keys, of a full stroke device operable on said common member during its movement in one only of said planes.

56. In a cash register, the combination with a counter including transfer devices, of operating devices therefor, a transfer actuator, means for actuating same, and means for preventing premature operation of the transfer actuator by an overthrow of a counter element.

57. In a cash register, the combination with a counter, of operating devices therefor, a transferring member, means for actuating same, and means to reset the transferring member when the same has been prematurely set by an excessive operation of a counter element.

In testimony whereof I affix my signature, in the presence of two witnesses.

THOMAS CARROLL.

Witnesses:
ALVAN MACAULEY,
IRA BERKSTRESSER.